US012385589B2

(12) United States Patent
Cook et al.

(10) Patent No.: US 12,385,589 B2
(45) Date of Patent: Aug. 12, 2025

(54) NOISE SUPPRESSION UNIT

(71) Applicant: Dimension Product Solutions LP, Crosby, TX (US)

(72) Inventors: George T. Cook, Crosby, TX (US); Burt Lusk, La Porte, TX (US)

(73) Assignee: Dimension Product Solutions LP, Crosby, TX (US)

( * ) Notice: Subject to any disclaimer, the term of this patent is extended or adjusted under 35 U.S.C. 154(b) by 131 days.

(21) Appl. No.: 17/459,926

(22) Filed: Aug. 27, 2021

(65) Prior Publication Data

US 2023/0064984 A1 Mar. 2, 2023

(51) Int. Cl.
*F16L 55/033* (2006.01)
*G10K 11/168* (2006.01)

(52) U.S. Cl.
CPC ........ *F16L 55/0336* (2013.01); *G10K 11/168* (2013.01)

(58) Field of Classification Search
CPC ........ F01N 1/24; F01N 2470/10; F01N 1/026; F01N 1/04; F16L 55/0336; G10K 11/168; F02K 1/827; B32B 2597/00; B32B 2307/10
USPC ........ 181/224, 252, 222, 256, 284, 290, 207
See application file for complete search history.

(56) References Cited

U.S. PATENT DOCUMENTS

| 3,112,007 | A | * | 11/1963 | Ludlow | F01N 1/10 |
| | | | | | 181/227 |
| 3,263,774 | A | * | 8/1966 | Reese | A47F 9/045 |
| | | | | | 186/62 |
| 3,937,590 | A | * | 2/1976 | Mani | F02C 7/045 |
| | | | | | 181/207 |
| 3,955,643 | A | * | 5/1976 | Clark | F01N 1/006 |
| | | | | | 181/248 |

(Continued)

FOREIGN PATENT DOCUMENTS

| CN | 111006092 | A | * | 4/2020 |
| CN | 210606613 | U | * | 5/2020 |

(Continued)

OTHER PUBLICATIONS

Machine Translation of JPH029905A Silencer and Manufacture Thereof (Year: 1990).*

(Continued)

*Primary Examiner* — Dedei K Hammond
*Assistant Examiner* — Jennifer B. Olson
(74) *Attorney, Agent, or Firm* — Greer, Burns & Crain, Ltd

(57) ABSTRACT

A noise suppression unit is provided and configured to reduce noise generated by gas flow, where the suppression unit includes a body including an inlet port and an outlet port, a central passage structure extending between a first end and a second end of the body, at least one layer of a first absorbing material on the central passage structure and at least one layer of a second absorbing material on the central passage structure, where the first absorbing material and the (Continued)

second absorbing material are different. Sound waves generated by gas flow through the suppression unit passes through the central passage structure and the at least one layer of the first absorbing material and the at least one layer of the second absorbing material to reduce the sound waves and thereby the noise generated by the gas flow.

19 Claims, 11 Drawing Sheets

(56) References Cited

U.S. PATENT DOCUMENTS

| | | | | |
|---|---|---|---|---|
| 4,211,303 | A * | 7/1980 | Matthews | F01N 1/24 181/258 |
| 4,635,753 | A * | 1/1987 | Itani | F01N 1/10 181/239 |
| 6,283,245 | B1 * | 9/2001 | Thurman | E04F 17/04 181/224 |
| 7,810,609 | B2 * | 10/2010 | Sikes | F01N 1/24 181/246 |
| 2006/0272888 | A1 | 12/2006 | Lucas et al. | |
| 2009/0200105 | A1 * | 8/2009 | Geyer, III | F01N 1/082 181/243 |
| 2017/0074290 | A1 * | 3/2017 | Ponyavin | F04D 29/522 |

FOREIGN PATENT DOCUMENTS

| | | | |
|---|---|---|---|
| CN | 210829439 U | * | 6/2020 |
| CN | 212643888 U | * | 3/2021 |
| JP | H029905 A | * | 1/1990 |
| JP | H09256834 | * | 9/1997 |

OTHER PUBLICATIONS

Machine Translation of CN-111006092-A Multifunctional silencer (Year: 2020).*
Machine translation of CN210606613U Description (Year: 2020).*
Machine translation of CN212643888U Description (Year: 2021).*
Machine translation of CN-210829439-U (Year: 2020).*
Machine translation of JP H09256834 (Year: 1997).*

* cited by examiner

NOISE SUPPRESSION UNIT

BACKGROUND

The present application relates generally to a sound and vibration suppression unit, and more particularly, to a suppression unit attached to an inlet or outlet duct or a blower of commercial and industrial equipment that reduces noise and vibration generated by the equipment.

Commercial and industrial equipment have ducts and vents that exhaust high pressure gases to the atmosphere, which results in very high noise and vibration levels. In some cases, the noise and vibrations generated by such equipment is significant and exceeds safe noise levels thereby requiring people that work with or near the equipment to wear hearing protection. Additionally, the noise and vibrations may be a nuisance to nearby businesses and residents.

Conventional sound suppression units for commercial and industrial equipment include baffled mufflers and sound absorptive mufflers attached to vents or blowers associated with the equipment. Baffled mufflers include internal baffles that cause exhausted gases or air to flow along an indirect route through the muffler thereby disrupting the flow of the gases and air and reducing the noise and vibration generated by the gases and air. Sound absorptive mufflers include a housing with sound absorptive material that absorbs and reduces sound energy from the gases or air flowing through the mufflers. In this way, sound waves are reduced as the sound energy is converted into heat in the absorptive material. Such sound suppression units have limited effectiveness across various equipment, applications and noise types. Additionally, these suppression units do not address ambient noise produced by noise and vibration transmission through the equipment housings, ducts and vents.

Therefore, it is desirable to provide a suppression unit for inlet and outlet vents and ducts of commercial and industrial equipment that significantly reduces the noise and vibrations generated by the equipment.

SUMMARY

The present noise suppression unit is attached to an inlet duct or an outlet duct of an industrial machine and configured to reduce the sound waves generated by a gas, such as air, that flows into or out of the industrial machine. Reducing the sound waves significantly reduces the ambient noise generated by the gas flowing into or out of the industrial machine.

In an embodiment, a noise suppression unit is provided and configured to reduce noise generated by gas flow, where the suppression unit includes a body including an inlet port and an outlet port, a central passage structure extending between a first end and a second end of the body, at least one layer of a first absorbing material on the central passage structure and at least one layer of a second absorbing material on the central passage structure, where the first absorbing material and the second absorbing material are different. Sound waves generated by gas flow through the suppression unit passes through the central passage structure and the at least one layer of the first absorbing material and the at least one layer of the second absorbing material to reduce the sound waves and thereby the noise generated by the gas flow.

In another embodiment, a noise suppression unit is provided and configured to reduce noise generated by gas flow, where the suppression unit includes a body including opposing end plates that defines an interior space, an inlet port attached to one of the end plates and an outlet port attached to another of the end plates and a central passage structure extending between the inlet port and the outlet port in the interior space of the body. A primary absorbing area and a secondary absorbing area are each positioned on the central passage structure, where the primary absorbing area and the secondary absorbing area are different, and the primary absorbing area and the secondary absorbing area are positioned adjacent to each other. In operation, sound waves generated by the gas flow pass through the central passage structure and the and the secondary absorbing area to reduce the sound waves and thereby the noise generated by the gas flow.

DETAILED DESCRIPTION

Figure 1:
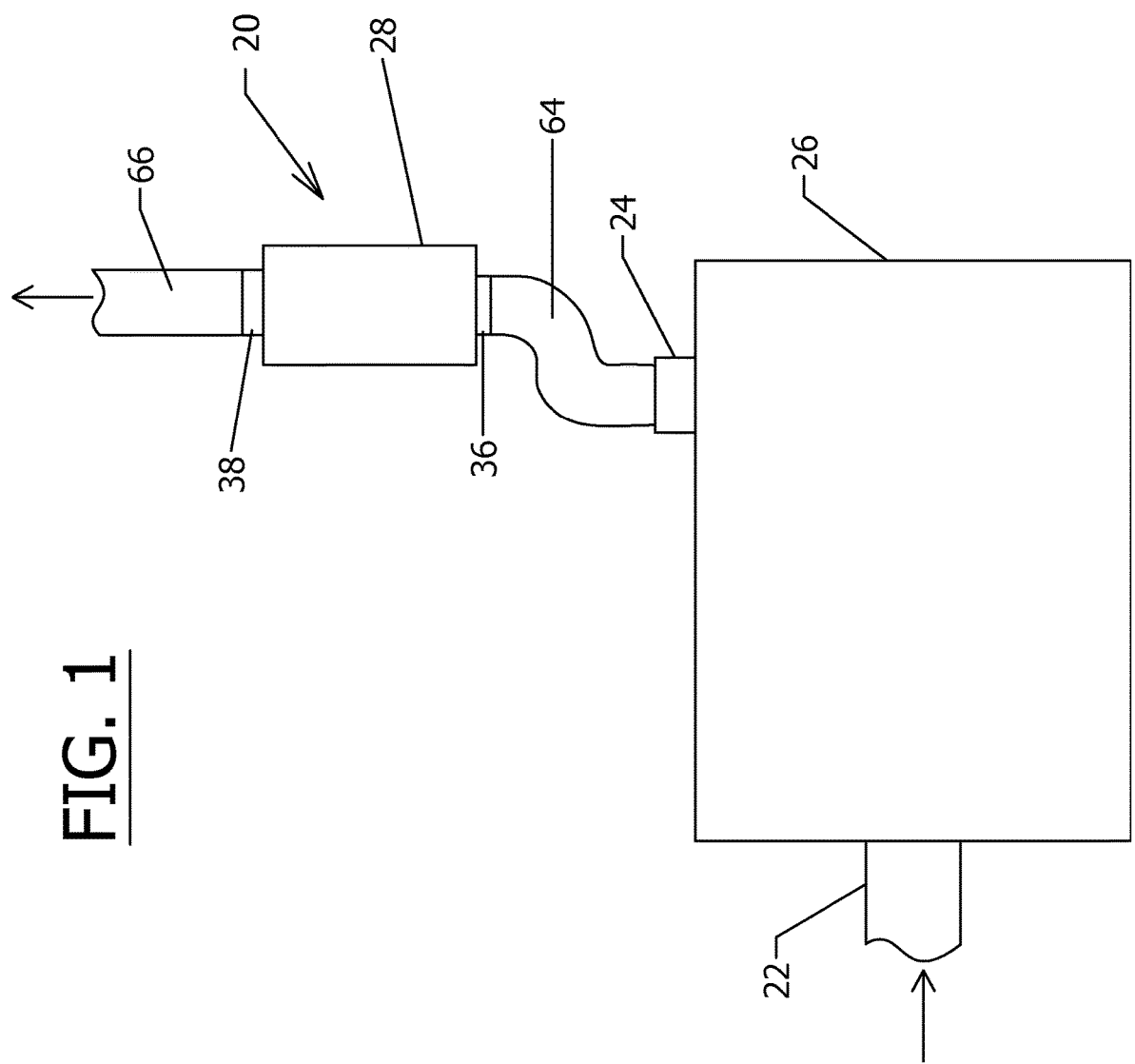
FIG. 1 is a schematic view of a machine including the present exhaust suppression unit.
Figure 2:
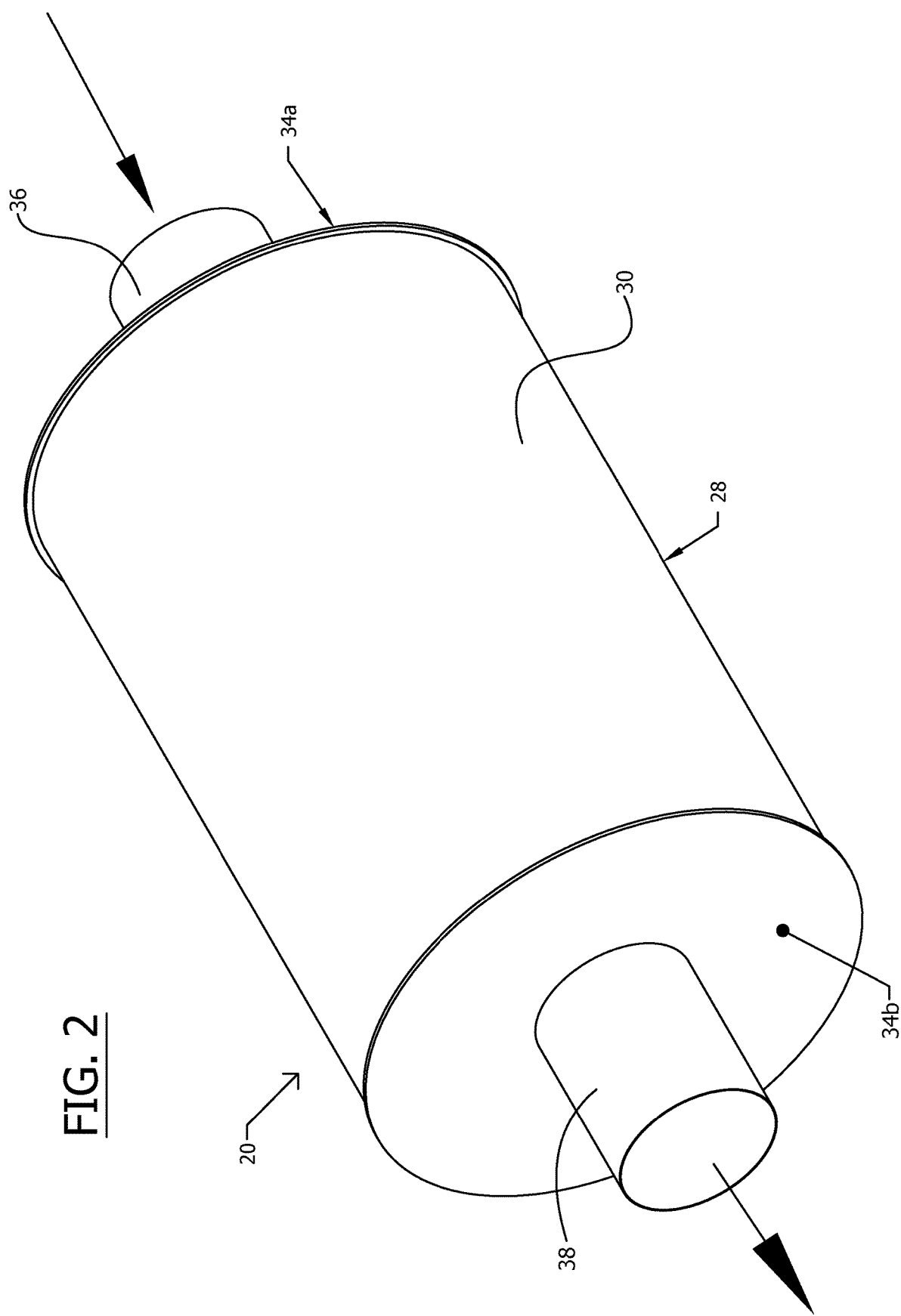
FIG. 2 is a perspective view of the exhaust suppression unit of FIG. 1.
Figure 3:
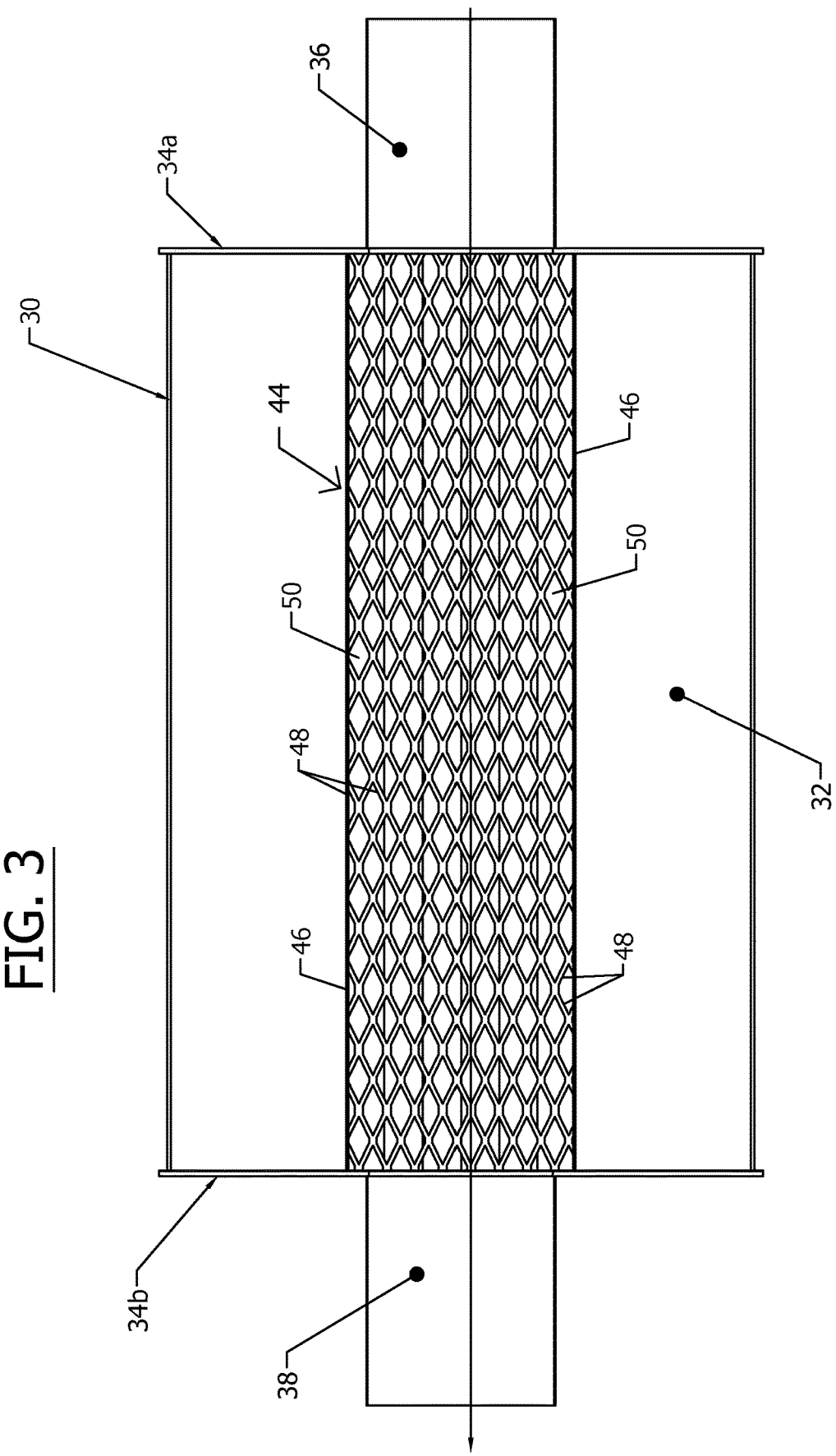
FIG. 3 is cross-section view of the exhaust suppression unit taken substantially along line 2-2 in FIG. 2 in the direction generally indicated, where the sound absorbing materials are removed.

The present noise suppression unit is shown in FIG. 1 and generally indicated as 20, where the suppression unit 20 is attached to a gas flow inlet 22 or an exhaust outlet 24 of an industrial machine 26 to suppress noise (and vibration) generated by the industrial machine during operation. As shown, the suppression unit 20 is attached to an exhaust vent or exhaust duct of an industrial machine but may also be attached a gas flow inlet or blower of the industrial machine or directly to the industrial machine.

Referring now to FIGS. 2-9, the suppression unit 20 includes a housing 28 having a cylindrical body 30 defining a hollow interior space 32. End plates 34*a*, 34*b* are attached to each end of the body 30 by welding the end plates to the body or by another suitable attachment method. At one end of the body 30, an inlet duct 36 is attached to the end plate 34a and has a cylindrical shape. The inlet duct 36 extends a designated distance from the end plate 34a and is configured to be attached to an inlet duct or to an exhaust duct of an industrial machine or directly to the industrial machine. Similarly, an opposing end of the body 30 includes an outlet duct 38 having a cylindrical shape and extending a designated distance from the end plate 34b. As shown in FIG. 1, the outlet duct 38 is configured to be attached to a duct that extends through a wall or roof of a building to vent the gas flow to the atmosphere. The inlet duct 36 and the outlet duct 38 on the body 30 are preferably welded to the end plates 34a, 34b but may be attached to the end plates using any suitable attachment method. In this embodiment, the diameter of the body 30 and the diameters of the inlet duct 36 and the outlet duct 38 are based on the amount of noise generated by the industrial machine that the suppression unit 20 is attached to so that the noise generated by gas flow to or from the industrial machine is at a desired ambient noise level. In this embodiment, the body 30, the end plates 34a, 34b, the inlet duct 36 and the outlet duct 38 are preferably made of a metal, such as stainless steel. It should be appreciated that the body 30, the end plates 34a, 34b, and the inlet duct 36 and the outlet duct 38 may be made out of any suitable material or combination of materials.

Figure 4:
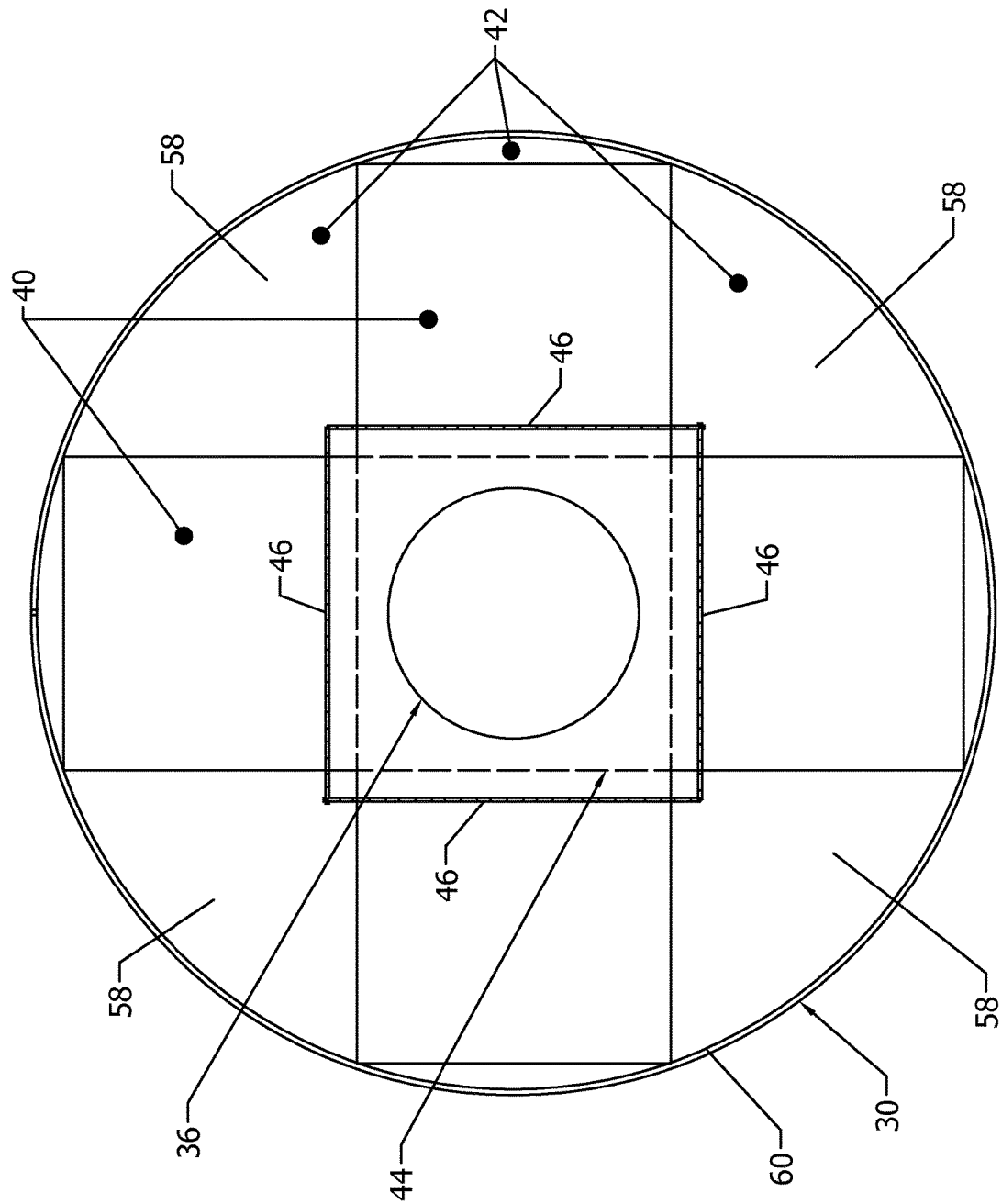
FIG. 4 is an front end view of the exhaust suppression unit of FIG. 1 with an end plate and the sound absorbing materials removed.
Figure 5:
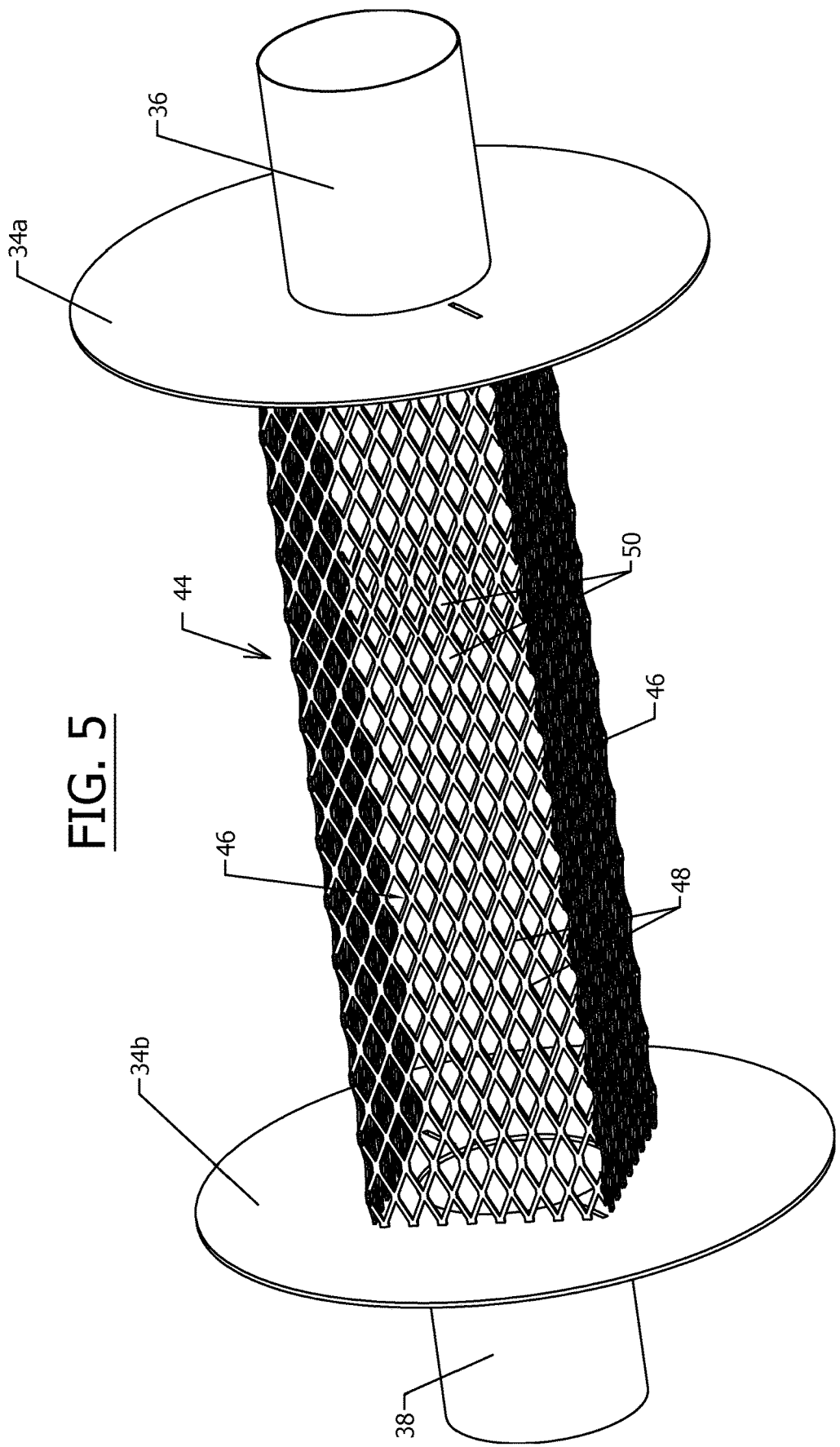
FIG. 5 is a perspective view of the passage structure and end plates of the exhaust suppression unit of FIG. 1.

Referring to FIGS. 3-6, the interior space 32 of the body 30 includes a primary or first absorbing area 40, and a secondary or second noise absorbing area 42 that each suppress the sound and vibration of the gas flowing through suppression unit, where the gas may be air or any gas or combination of gases. Specifically, a central passage structure 44 extends between the interior openings of the inlet duct 36 and the outlet duct 38 as shown in FIG. 5. In the illustrated embodiment, the central passage structure 44 has a square shape but it's contemplated that the central passage structure may have a circular shape, a rectangular shape or any suitable shape for suppressing the noise and vibration produced by the gas flowing through the suppression unit 20. The central passage structure 44 is formed with four interconnected, permeable sides 46 where each of the sides has angled members 48 made of metal formed in a criss-cross pattern where the angled members define a plurality of openings 50. In this embodiment, the openings 50 in the sides 46 of the central passage structure 44 enable the gas flowing through the central passage structure and corresponding sound waves to pass through the central passage structure and into the first and second absorbing areas 40, 42 as described below. The size of the openings 50 is configured to enable both relatively small and large sound waves to pass through the central passage structure 44.

Figure 6:
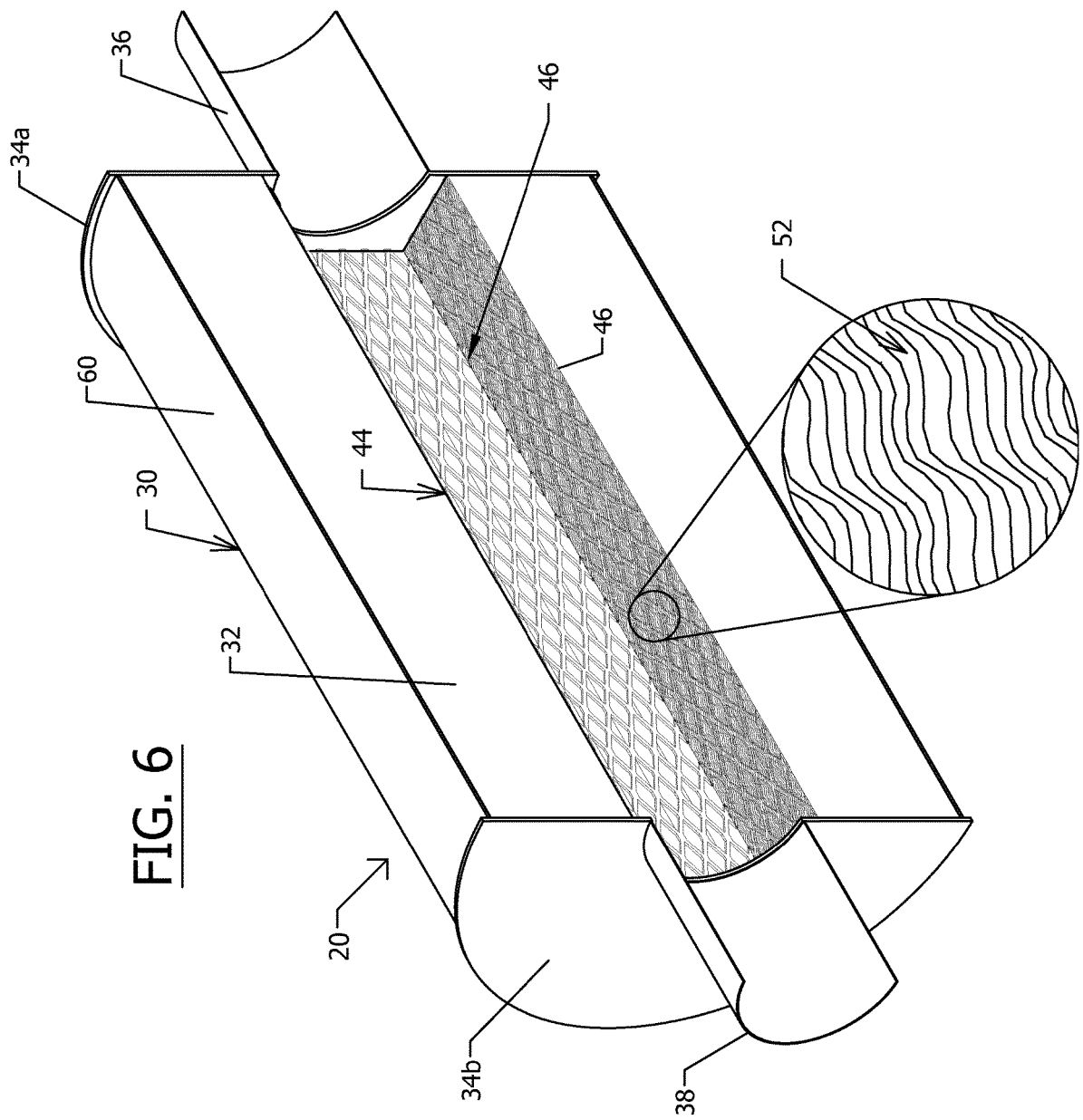
FIG. 6 is cross-section perspective view of the exhaust suppression unit taken substantially along line 6-6 in FIG. 2 in the direction generally indicated, showing the passage structure.
Figure 7:
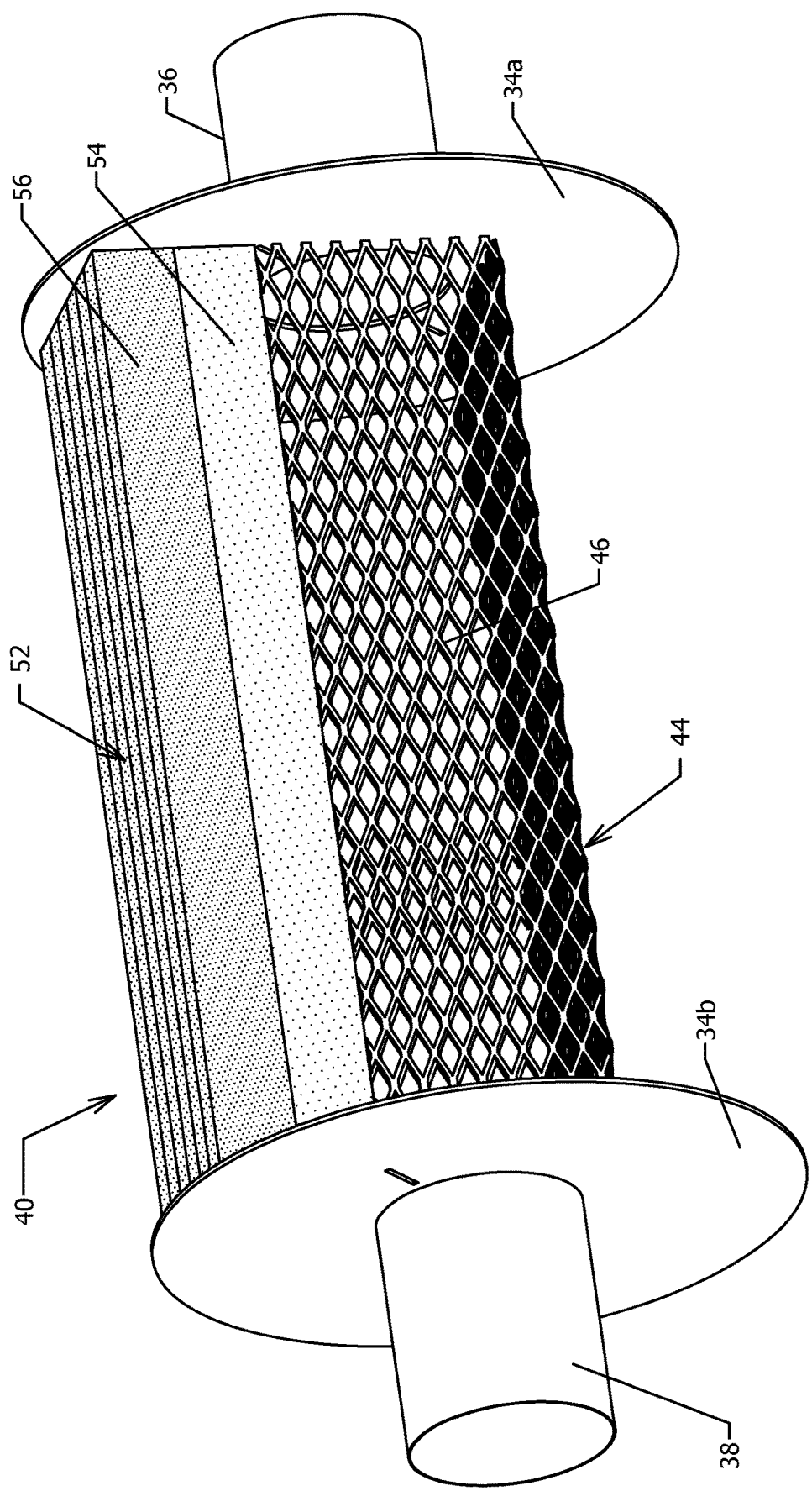
FIG. 7 is a perspective view of the passage structure and sound absorbing materials of the exhaust suppression unit of FIG. 1.
Figure 8:
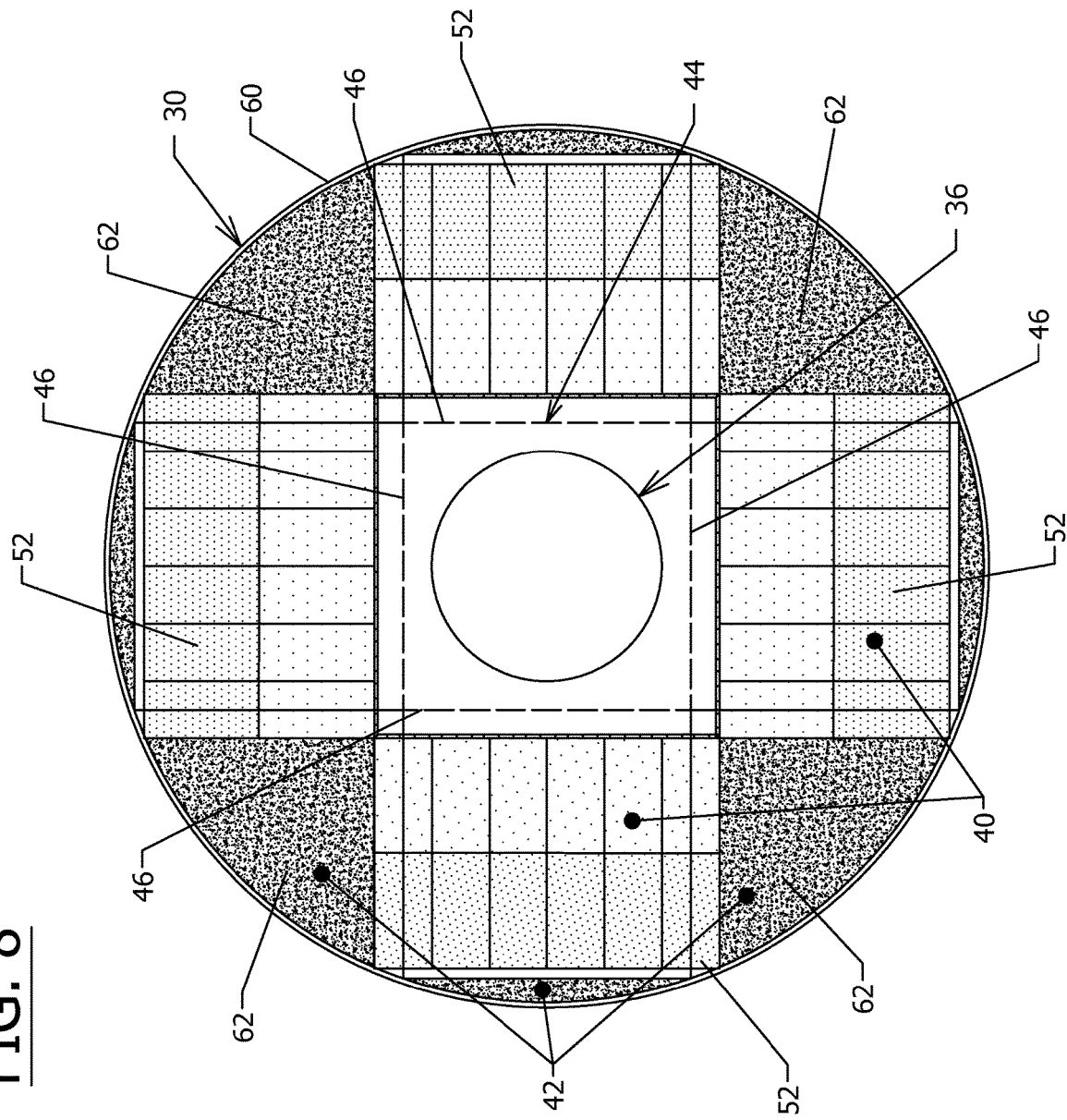
FIG. 8 is a front end view of the exhaust suppression unit of FIG. 1 with an end plate removed.

As shown in FIGS. 7 and 8, at least one and preferably a plurality of layers of a first absorbing material 52 is placed on each of the sides 46 of the central passage structure 44 to form the primary or first absorbing area 40 of the suppression unit 20. A first layer 54 is placed on or attached to the sides 46 of the central passage structure 44 by an adhesive or any suitable attachment method. Similarly, a second layer or subsequent layer 56 of the first absorbing material 52 is placed on the first layer 54 or attached to the first layer by an adhesive. It should be appreciated that one or a plurality of layers of the first absorbing material 52 may be placed on the sides 46 of the central passage structure 44. Furthermore, one or more of the sides 46 may have the same number of layers of the first absorbing material 52 or a different numbers of layers of the first absorbing material 52. For example, one side of the central passage structure 44 may have a single layer of the first absorbing material 52, and the other sides may have two or more layers of the first absorbing material 52. In this embodiment, the first absorbing material 52 is preferably a semi-rigid layer of a sound absorbing material or media having directionally biased fibers with corresponding voids as shown in FIG. 6 that is configured to absorb noise and vibration. As shown, the layer or layers of the first absorbing material 52 each have a rectangular cross-sectional shape. It should be appreciated that the cross-sectional shape of the layers of the first absorbing material 52 may be square-shaped, polygonal-shaped or any suitable cross-sectional shape. Furthermore, each of the layers of the first absorbing material 52 may be the same material or one or more of the layers of the first absorbing material 52 may be made of a sound absorbing material that is different from the other layers of the first absorbing material 52. As arranged, the layer or layers of the first absorbing material 52 on the sides 46 of the central passage structure 44 each provide the primary sound absorption for the noise and vibration produced by the gas or gases flowing through the suppression unit 20.

As shown in FIGS. 4 and 8, the interior space 32 of the body 30 includes generally triangular spaces or wedge-shaped spaces 58 that are between the layers of the first absorbing material 52. Each wedge-shaped space 58 extends radially from the central passage structure 44 to an inner surface of the wall 60 forming the cylindrical body 30 and extend along the length of the body defined between the end plates 34a and 34b. The spaces 58 are filled with a second absorbing material 62 as shown in FIG. 8 which is formed as wedge-shaped layers extending between the end plates 34a and 34b. The second absorbing material 62 acts as the secondary absorbing area 42, where the second absorbing material is a dense, amorphous, fiber-based sound absorptive material. In the illustrated embodiment, the layers of the second absorbing material 62 are less diffuse and have a different geometry than the layers of the first absorbing material 52 and along with the amorphous fiber arrangement, the second absorbing material layers operate by means of the same acoustic absorption properties as the first absorbing material layers while enabling effective noise reduction at different frequencies, intensities and incident angles of interacting sound waves. It should be appreciated that the dimensions of each of the layers of the second absorbing material 62 is determined by the size of the suppression unit 20.

Figure 9:
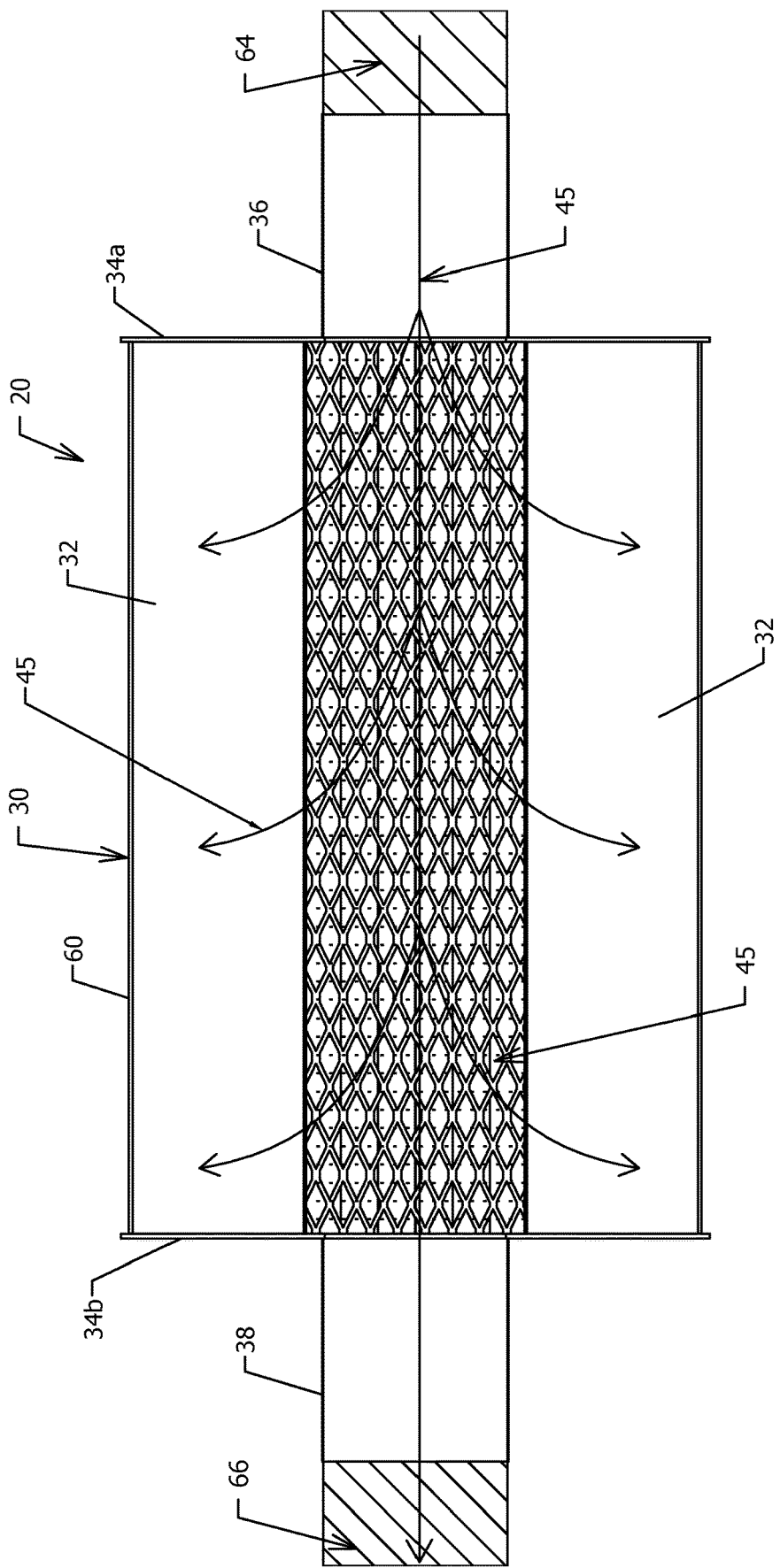
FIG. 9 is schematic view of the exhaust suppression unit of FIG. 1 showing the gas flow through the exhaust suppression unit of FIG. 1.
Figure 10:
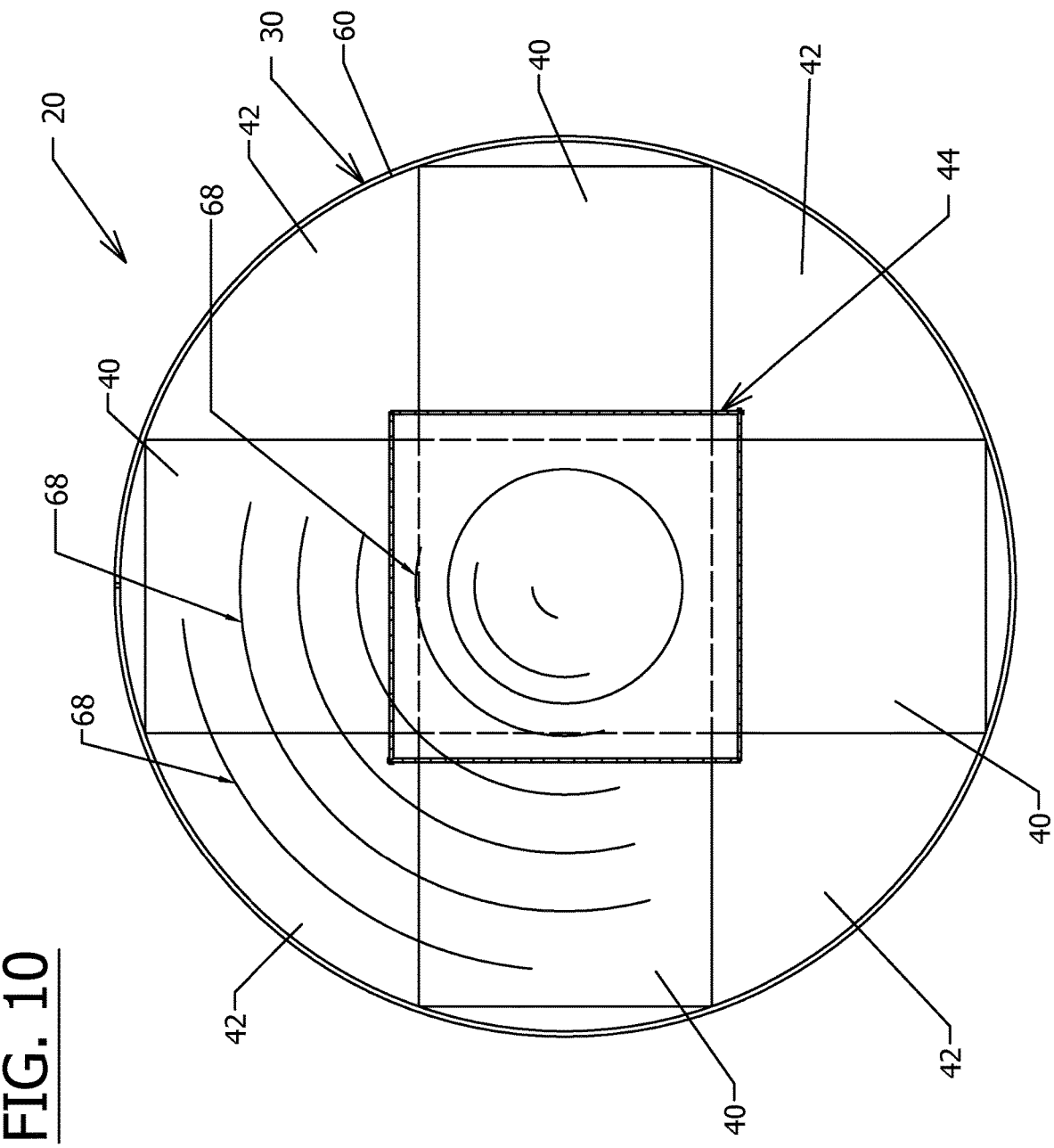
FIG. 10 is schematic end view of the exhaust suppression unit of FIG. 1 showing the sound waves and reflected sound waves generated by the gas flowing through the exhaust suppression unit.
Figure 11:
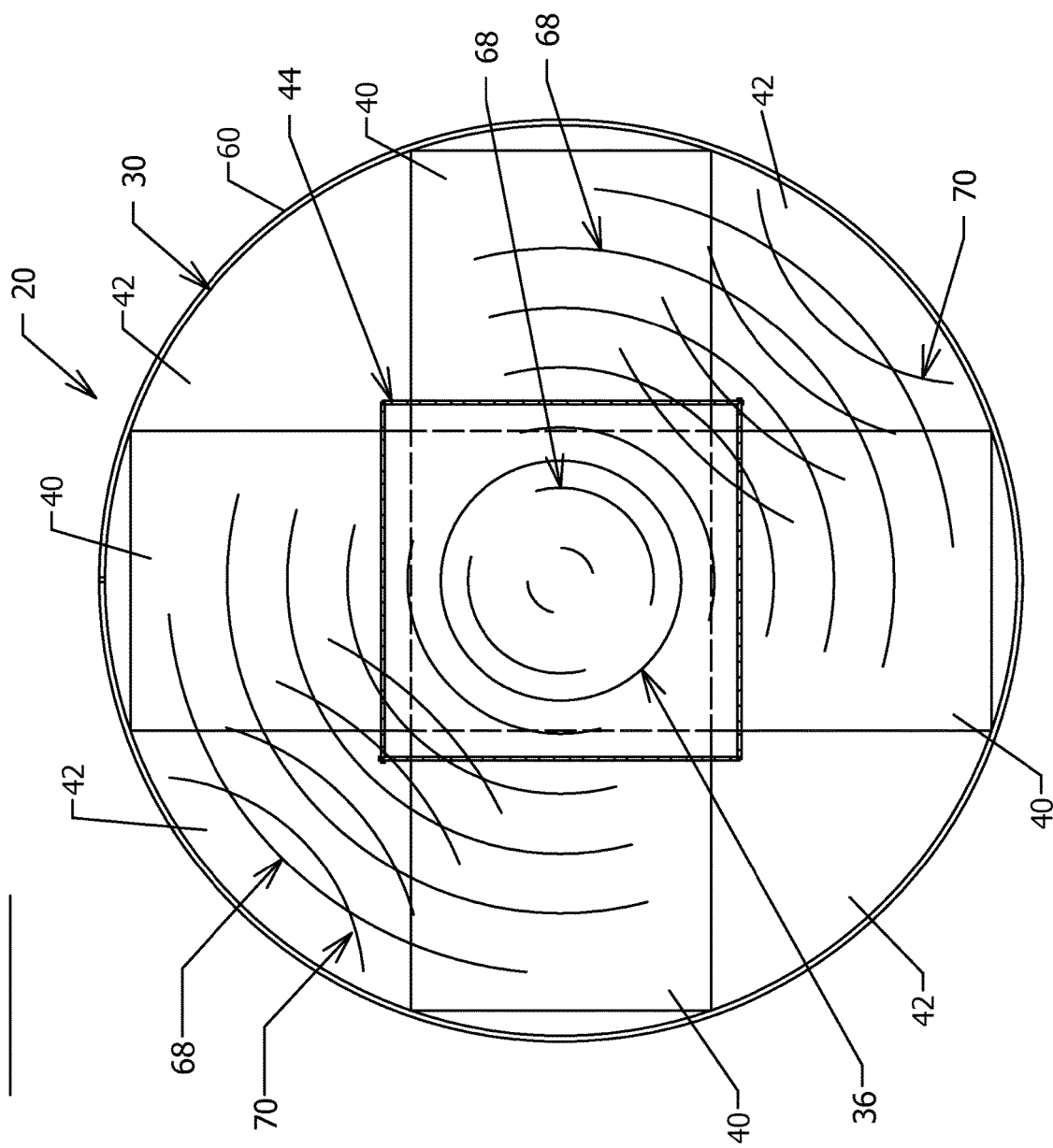
FIG. 11 is schematic end view of the exhaust suppression unit of FIG. 1 showing the sound waves emitted by the gas flowing through the passage structure.

Referring to FIGS. 9-11, in operation, a gas, such as air, or gases flow into the interior space 32 of the body 30 of the suppression unit 20 from an inlet gas duct 64 and through the inlet duct 36 as shown by arrow 45. As the gas flows through the central passage structure 44, a portion of the gas flows generally parallel through the central passage structure and exits through the outlet duct 38 to an outlet gas duct 66, and another portion of the gas flows through the openings 50 in the sides 46 of the permeable central passage structure 44. The sound waves 68 generated by the flowing gas then pass through the layer or layers of the first absorbing material 52, i.e., the primary absorbing area 40, which reduces the sound waves by acoustic absorption and transmission of wave energy to the directionally based fibers of the first absorbing material. A portion of the sound waves 68 also pass through the wedge-shaped layers of the second absorbing material 62, i.e., the secondary absorbing area, where the second absorbing material is a denser, amorphous, fiber-based material that further reduces the sound waves and enhances the transmission of the energy from the sound waves to the second absorbing material. As the sound waves 68 pass through the first and second absorbing material layers, the reduced sound waves are reflected by the inner surface of the wall 60 and the reflected sound waves 70 travel back through the first and second absorbing material layers as shown in FIG. 11. Traveling or passing back through the first and second absorbing material layers further reduces the sound waves through conversion of energy from the sound waves to the first and second material layers. The reduced sound waves then pass through the central passage structure 44 and the layers of the first and second absorbing materials 52, 62 on the opposing side or sides of the central passage structure 44, where the reduced sound waves are further reduced. In this way, the sound waves are continuously reflected and reduced within the interior space 32 of the body 30 as described above, which significantly dissipates the sound waves so that only a small fraction or percentage of the original sound waves pass through the outlet port 38 and/or emanate from the body 30 as sound waves or noise.

In the above process, sound waves 68 generated by the gas flow through the suppression unit 20 propagate from the central passage structure 44 in multiple directions, forms and fronts. As such, all of the sound waves 68 are subject to wave cancellations and destructive interferences as wave fronts pass through each other in several directions from initial propagation to all of the reflected sound waves caused during the process via known physics of noise cancellation, phase/wave cancellation and/or destructive interference. In this regard, the predominant action of the sound waves and reflected sound waves passing through each other in the above process, causes the destructive interference of the sound waves to be greater than constructive wave interactions thereby resulting in a net increase of sound wave degradation, i.e., sound reduction.

Furthermore, heat is generated when the energy of the sound waves 68 is converted or transferred to the first and second absorbing materials 52, 62 as the sound waves and reflected sound waves pass through the first and second absorbing material layers. This heat is conducted through the first and second absorbing materials 52, 62 and the wall 60 of the body 30 and is transmitted to the ambient air surrounding the exterior of the suppression unit 20. Heat is also conducted by the central passage structure 44 by energy conversion from the sound waves and from heat generated by process of the industrial machine.

Unlike conventional noise reduction units, the present suppression unit 20 utilizes the central passage structure 44 to promote the free passage of sound waves at different sizes and frequencies through the first and second absorbing materials 52, 62, which combine sound absorption and phase cancellation to significantly reduce the sound waves, and thereby the ambient noise, generated by the gas flowing through the suppression unit 20 from an industrial machine. Furthermore, upon entering the absorbing material the sound waves are distorted while passing to the body or are absorbed by the absorbing material, and in the distorted or absorbed stage, the sound waves collide creating heat or sound wave destruction resulting in noise suppression.

While particular embodiments of the present sole are shown and described, it will be appreciated by those skilled in the art that changes and modifications may be made thereto without departing from the invention in its broader aspects and as set forth in the following claims.

What is claimed is:

1. A noise suppression unit configured to reduce noise generated by gas flow, the suppression unit comprising:
    a body including an inlet port and an outlet port;
    a central passage structure including at least two sides, said at least two sides extending from said inlet port to said outlet port of the body, each of said at least two sides having a length;
    a first absorbing material member contacting an outer surface of each of said at least two sides of said central passage structure along the entirety of said length of said at least two sides;
    a space formed between each of said first absorbing material members and said central passage structure, and said body; and
    a second absorbing material member filling an entirety of said space, said second absorbing material member being between each adjacent first absorbing material members on each of said at least two sides of said central passage structure, where said second absorbing material member is out of contact with said at least two sides of said central passage structure, and where said first absorbing material member and the second absorbing material member are different,
    wherein sound waves generated by the gas flow passes through the central passage structure and the first absorbing material members and the second absorbing material member to reduce the sound waves and thereby the noise generated by the gas flow.

2. The noise suppression unit of claim 1, wherein said central passage structure includes angled members that cross each other and define a plurality of openings.

3. The noise suppression unit of claim 1, wherein said first absorbing material member includes a semi-rigid, sound absorbing material having directionally biased fibers.

4. The noise suppression unit of claim 1, wherein said second absorbing material member includes a dense, amorphous, fiber-based sound absorptive material.

5. The noise suppression unit of claim 1, wherein at least one of said body and said central passage structure is made of metal.

6. The noise suppression unit of claim 1, wherein said central passage structure includes four sides and said first absorbing material member is on the outer surface of each of said sides of said central passage structure.

7. The noise suppression unit of claim 1, further comprising at least two of the first absorbing material members, wherein said at least two first absorbing material members are on the outer surface of one side of said at least two sides of said central passage structure.

8. The noise suppression unit of claim 1, wherein said second absorbing material member is positioned adjacent to said first absorbing material members on the central passage structure.

9. The noise suppression unit of claim 1, wherein said second absorbing material member is wedge-shaped and positioned between said central passage structure and a wall of said body.

10. A noise suppression unit configured to reduce noise generated by gas flow, the suppression unit comprising:
    a body including opposing end plates that defines a hollow interior space;
    an inlet port attached to one of said end plates and an outlet port attached to another of said end plates;

a central passage structure including a plurality of sides that extend from said inlet port to said outlet port in said interior space of said body, each of said plurality of sides having a length;

a primary absorbing member positioned directly on an outer surface of each of said plurality of sides of said central passage structure along the entirety of said length of said plurality of sides;

a space formed between each of said primary absorbing members and said central passage structure, and said body;

a secondary absorbing member filling an entirety of said space formed between said body and said central passage structure and said primary absorbing members, wherein said secondary absorbing member is out of contact with said plurality of sides of said central passage structure, wherein said primary absorbing members and said secondary absorbing member are different, and wherein said primary absorbing members and said secondary absorbing member are positioned adjacent to each other and said secondary absorbing member is between each of said primary absorbing members on said outer surface of each of said plurality of sides, wherein sound waves generated by the gas flow pass through the central passage structure and the and the secondary absorbing member to reduce the sound waves and thereby the noise generated by the gas flow.

11. The noise suppression unit of claim 10, wherein said primary absorbing member includes a first absorbing material made of a semi-rigid, sound absorbing material having directionally biased fibers.

12. The noise suppression unit of claim 10, wherein said secondary absorbing member includes a second absorbing material made of a dense, amorphous, fiber-based sound absorptive material.

13. The noise suppression unit of claim 10, wherein said central passage structure includes angled members that cross each other and define a plurality of openings.

14. The noise suppression unit of claim 10, wherein said primary absorbing member includes a plurality of layers of a first absorbing material.

15. The noise suppression unit of claim 14, wherein at least one of said body and said central passage structure is made of metal.

16. The noise suppression unit of claim 10, wherein at least one of said body and said central passage structure is made of metal.

17. The noise suppression unit of claim 10, wherein said primary absorbing member includes a plurality of layers of a first absorbing material, and said secondary absorbing member includes a plurality of layers of a second absorbing material, and wherein said layers of said first absorbing material and said layers of said second absorbing material are alternately positioned on the central passage structure.

18. The noise suppression unit of claim 1, wherein said central passage structure defines a hollow, unobstructed interior space between said inlet port and said outlet port.

19. A noise suppression unit configured to reduce noise generated by gas flow, the suppression unit comprising:

a body including an inlet port and an outlet port;

a central passage structure including at least two sides, said at least two sides extending from said inlet port to said outlet port of the body, each of said at least two sides having a length;

a first absorbing material member contacting an outer surface of each of said at least two sides of said central passage structure along the entirety of said length of said at least two sides;

at least one additional first absorbing material member contacting the first absorbing material member; and a second absorbing material member between said body and said central passage structure, said second absorbing material member being between each of the first absorbing material members on each of said at least two sides of said central passage structure, where said second absorbing material member is out of contact with said at least two sides of said central passage structure, and where said first absorbing material members and the second absorbing material member are different, wherein sound waves generated by the gas flow passes through the central passage structure and the first absorbing material members and the second absorbing material member to reduce the sound waves and thereby the noise generated by the gas flow.

* * * * *